United States Patent Office 3,825,640
Patented July 23, 1974

3,825,640
PROCESS FOR MANUFACTURING A POROUS, SOLID, ARTICLE
Theodore Maierson, Dayton, Ohio, assignor to The National Cash Register Company, Dayton, Ohio
No Drawing. Filed Apr. 27, 1972, Ser. No. 248,157
Int. Cl. B29c 1/14
U.S. Cl. 264—87                                   2 Claims

ABSTRACT OF THE DISCLOSURE

A process for manufacturing an article is disclosed wherein the article includes the features of a solid and a liquid and is also porous and, therefore, relatively lightweight. The article comprises a mass of substantially spherical, liquid-containing, microcapsules adhered together at capsule-to-capsule points of contact by dot amounts of cured adhesive material such that intercapsule voids are maintained to provide porosity. One embodiment of the process includes steps of filling a mold with the microcapsules and introducing and withdrawing a liquid, curable, adhesive material to leave only a residual amount of the curable adhesive material at capsule-to-capsule points of contact.

BACKGROUND OF THE INVENTION

Field of the Invention

This invention pertains to a process for manufacturing solid, shaped, articles of liquid-containing capsules. The process further relates to manufacturing such articles wherein the capsules are individually adhered to other capsules by dot amounts of adhesive material and wherein the intercapsule space is void to provide the characteristic of porosity to the articles.

The articles manufactured have been found eligible for use in a multitude of ways. Examples of articles include marking crayons; cleaning, waxing or polishing blocks; fire starters; adhesive applicators; lubricators; chemical dispensers; toys; novelties; decorative items and the like. The articles are characterized by being porous and by comprising microcapsules which contain some desired or required liquid material and which are adhered together only at points of capsule-to-capsule contact.

The process relates to steps of filling and emptying molds of a certain shape with component materials of a particular kind including the capsules and the adhesive material. Additionally, the process pertains to hardening the residual adhesive material which is present after an adhesive removal step. That residual adhesive material is only the material which remains, as a result of surface forces, around the capsule-to-capsule points of contact. The amount of such material is slight, and the word "dot" is used herein to denote a minute amount or a speck of the material.

The field of the invention relates, generally, to solid, shaped, porous, liquid-containing articles, to the manufacture of such articles, and to new uses for such articles as well as uses for such new articles.

Description of the Prior Art

Solid articles of hollow or lightweight spheres cured into a solid or continuous matrix of polymeric material are taught by the prior art.

U.S. Pat. No. 3,100,678, issued Aug. 13, 1963 on the application of E. E. Joiner et al., discloses that solid, lightweight, shoe heels can be manufactured by polymerizing a mixture of expanded beads within a continuous matrix of curing adhesive material. The process disclosed therein simply comprises filling a mold with the mixture of materials and curing the liquid matrix. The beads do not contain liquid and the article is not porous.

U.S. Pat. No. 3,103,406, issued Sept. 10, 1963 on the application of J. V. Milewski et al., discloses solid articles of a cured polymeric matrix having hollow glass microballoons distributed therethroughout. Although this patent teaches that the solid articles are porous, there is no porosity in the sense that there are intertwining and continuous, minute, pathways extending through the article. The matrix polymer is solid and the microballoons are hollow with sealed and seamless walls and each is completely surrounded by the matrix material. The article of this patent can be called porous only in that the hollow microballoons provide a closed-cell structure having a reduced density. The meaning of the word porous, as used in describing my invention claimed herein, means an open-cell structure wherein intercapsule spaces are void of matrix polymer and are connected in complex and tortuous pathways which form a substantial portion of the volume of the article.

U.S. Pat. No. 3,316,187, issued Apr. 25, 1967 on the application of G. J. Grosner et al., discloses that hollow microballoons can be dispersed into curable polymeric sealant material to provide a strong, solid, masonry binder composition.

Capsules, especially liquid-containing capsulues have been disclosed, in the prior art, as a part of a structure wherein the capsules are dispersed in a continuous matrix of some sort of polymeric material. U.S. Pat. No. 3,619,-842, issued Nov. 16, 1971 to the assignee herein, discloses incorporation of liquid-containing capsules into a hardenable and extrudible liquid mass. When hardened, the mass is solid and not porous. The extrusion process of that patent is entirely different from the molding claimed herein.

U.S. Pat. No. 3,541,194, issued Nov. 17, 1970 on the application of I. Resnick, discloses hollow glass spheres distributed in a continuous matrix of cured polymeric material. The process disclosed in that patent can include filling a mold first with the spheres and then adding curable matrix material. The matrix material is not withdrawn prior to curing, and the product is not porous nor does it incorporate liquid-containing capsules.

SUMMARY OF THE INVENTION

It is often required or desired to manufacture solid molded articles which include a multitude of minute capsules as an important element of the article. As an example, minute capsules have long been used as a solid form of liquid material. The minute capsules, which may contain any of an enormous number of liquid materials, can be used as a dry powder of apparently solid material or can be used as a coating of apparently dry, solid, particles. The capsules are rupturable by any means which provides adequate force to breach the capsule walls; the most usual means being by heat or pressure. On rupture, liquid contents are released from the capsules to accomplish the intended results, such as, to complete a chemical reaction, to release a solvent liquid, to make a mark of ink material, to expose an adhesive, to provide some surface treating material or to produce some other result in accordance with use of the article.

For many uses and, perhaps for most uses, the articles of liquid-containing capsules preferably include only a minimum amount of binder material. In structures of the past, the capsules or other particles have been entrapped in a continuous matrix of polymeric material which completely surrounds and encloses the capsules. In order to reach the capsule contents in the structures of the past, not only the capsule wall must be breached, but the matrix material must also be pushed aside. Many matrix materials are tough and hard and difficult to break or abrade; and, as a consequence, capsules contained therein are so well protected that the structure is less than completely satisfactory. In instances where use of the structure includes breaking capsules, the structure must have either soft matrix material or as little matrix material as possible. The process of the present invention permits manufacture of a solid structure of capsules with a very small amount of adhesive material such that the capsules are sufficiently exposed to be easily ruptured when rupture is desired.

It is an object of the present invention to provide a solid, shaped, article including, as one structural component, liquid-containing microcapsules. Additionally, it is an object of this invention to provide such a solid, shaped, article of microcapsules with only a small amount of polymeric adhesive material to bind the capsules together. More specifically, it is an object of this invention to provide such an article wherein the microcapsules are adhered together by dot amounts of adhesive material present only at the capsule-to-capsule points of contact and wherein the structure is porous by virtue of connected intercapsule voids substantially homogenously distributed throughout the structure. The porosity of the structure is characterized as permitting a fluid flow through the article.

The process, in general terms, includes: introducing microcapsules into a mold; fiilling the mold with a curable liquid system; withdrawing the free curable liquid; and curing the residual curable liquid. It is pointed out that not all of the curable liquid is removed from the mold during the withdrawal step. The so-called, free curable liquid is that liquid which can be taken away from the mold by application of a pressure gradient across the mold or, in some instances, by gravity draining forces. The so-called, residual curable liquid is that liquid which remains in the mold because of surface and capsule wetting forces. The residual curable liquid is situated at the capsule-to-capsule points of contact and it is only that residual curable liquid which is used in adhering capsules to other capsules to provide the porous, solid, structure.

The composition components of this invention include substantially spherical microcapsules and a curable liquid system. The microcapsules should be substantially spherical to assure an intercapsule pathway of spaces without blockage which might be caused by particle protrusions or by coincidental mating of adjacent, irregular, particles. The capsules can be manufactured in accordance with any of several known encapsulating processes including chemical methods of interfacial polymerization (U.S. 3,432,327) or phase separation (U.S. 3,415,758; U.S. 2,800,457) or solvent exchange (U.S. 3,516,943) or meltable dispersion (U.S. 3,161,602) or mechanical methods of film impingement (U.S. 3,015,128) or spraydrying (U.S. 3,016,308).

Materials eligible for use as capsule walls can be, generally, any film forming polymer. Specific capsule wall materials are usually selected to be insoluble and unreactive with the intended capsule contents and to be soluble or insoluble with some other selected solvent, such as water. Specific materials eligible for use as capsule walls include natural and synthetic polymers whether water soluble or not. Selection of a particular capsule wall material generally depends upon the process used to accomplish the necapsulation. Capsule wall materials include: gelatins, gum arabic, starches, carrageenin, urea-formaldehyde resins and melamine-formaldehyde resins, poly(alkylvinylether - co-maleic anhydride), poly(ethylene-co-maleic anhydride), poly(vinyl alcohol), poly(vinyl pyrrolidone), poly(ethylene oxide), albumin, poly(acrylic acid) and poly(methacrylic acid), ethyl cellulose, polystyrene, polyacrylonitrile, cellulose acetate butyrate, cellulose acetate phthalate, cellulose nitrate, epoxy resin, polyurethane, polyethylene and the like.

The capsule contents can be any material desired or required in some particular use for the article. For example, in marking pens or crayons, the capsules contain an ink of a dye dissolved or dispersed in some liquid vehicle. In cleaning or polishing articles, the capsules contain a cleaning solvent or some other cleaning or polishing compound. In general, the use to which an article is directed will dictate the material to be contained in the capsules. Organic and aqueous systems including colorants, reactants, adhesives, lubricants, solvents, and even materials such as fertilizers and insecticides are eligible for use in the article of this invention.

The microcapsules, as previously stated, should be substantially spherical and can range in size from only a few to as much as several thousand microns. The preferred capsule size range is from about 50 microns to about 250 microns and the most preferred capsule size is about 100 microns. The lower capsule size limit is critical to the practice of this process because it has been found that if the capsules are too small, the surface and wetting forces on the curable liquid are so great that the liquid cannot be withdrawn and the resulting structure is not porous. Another interesting aspect of the use of very small capsules in articles such as marking pens, is that the capsule structure exhibits increasingly strong capillary forces as the capsules decrease in size. The result is that pens with small capsules sometimes do not write effectively on some surfaces because wicking forces in the pen are stronger than wicking forces in the surface to be written on.

While the upper capsule size is not critical to actual practice of the process of this invention, the use of capsules larger than about 250 microns results in articles which exhibit reduced overall strength. Also, articles which are to be used to distribute a liquid by abrasive rupture of the capsules, should be made using capsules less than about 250 microns in average diameter because larger capsules are difficult to break. Articles which require neither high structural strength nor rupture of the capsules by abrading can use larger capsules with no unfavorable results. As an example, a brick of flammable solvent for use as a fire starter can be made from capsules of any size; capsules less than about 2000 microns being preferred in such a case because of the loud report given off by heat rupture of large capsules.

The curable liquid system can include any polymerizable or curable material to serve as a binder adhesive to hold capsules together. Examples of such materials include: epoxides; urethanes; unsaturated polyesters; alkyds and other resins. Also eligible as the polymer in the curable liquid system are polymeric materials which do not polymerize to harden. Such materials form adhesive bonds, for example, by simple evaporation of a volatile solvent. Examples of those non-reacting polymers include: polystyrene; acrylate plastics; nitrocellulose; polyamides resins; poly(vinyl butyral; poly(vinyl acetate); and poly(vinyl chloride). It is understood that the particular kind of polymeric binder is unimportant to practice of this invention. The binder can include any of the above classes or any combinations of any members.

An important and critical characteristic of the curable liquid system is the viscosity. The present process is practiced by flowing the curable liquid into and out of a mold wherein there are extremely small volumes to be filled and crevasses to be wetted. If the curable liquid viscosity is too high, both flowing into and withdrawing from the mold will be difficult and the results will be unsatisfactory. An excessive viscosity results in too much of the curable liquid being trapped in the structure, thus, closing all of the intercapsule spaces and preventing development of a porous structure.

Also to be guarded against is too low of a viscosity wherein too little adhesive material is retained at capsule contact points. Although great structural strength is not required for most uses of the articles, it should be noted that the adhesive bond between any individual capsule and the article itself should have more strength than the capsule wall material. Such a strength relationship is necessary to ensure that the capsules are ruptured instead of being merely broken off.

The preferred viscosity of the curable liquid system is from about 10 to about 200 centipoises. The most preferred range is from about 50 to 100 centipoises. Undiluted polymeric binder materials having a viscosity greater than about 200 centipoises can be cut with any appropriate solvent therefor to achieve the desired viscosity. The solvents are well-known and easily selected and should merely be capable of dissolving the polymeric binder without affecting the capsule walls. It is also desirable that the solvents be readily evaporable so that, on withdrawal of the curable liquid, the residual solvent can be evaporated either by simple diffusion from the capsule structure or by being carried from the structure by means of air forced therethrough.

There are two manners through which the steps of the present process can be conducted. One can be termed a two-step filling process and the other can be viewed to involve a single-step, continuous, filling operation. In the two-step fill, a mold is filled with microcapsules to the level desired for making the article. The filling may include vibration of the mold to ensure a close-packed arrangement of the capsules. Next, the mold is filled with the curable liquid system to completely wet and immerse all of the capsules. In introducing the curable liquid system, care must be exercised to avoid disturbing the capsule arrangement. Once the capsules are immersed, the free curable liquid of the system is withdrawn from the mold and such withdrawal is preferably by means of some pressure gradient applied across the mold. In present practice, preferred withdrawal is conducted by applying a vacuum to a lower opening of the filled mold; but equivalent results can be achieved using pressure applied at an upper opening. In either case, residual solvent can be evaporated by continuing the pressure gradient, after removal of the free curable liquid, to move a gas through the intercapsule voids. In most instances, such as with epoxy resin systems, the residual curable polymeric material is selected to be automatically polymerized after a predetermined time or on the occasion of a moderate temperature increase.

The single-step continuous filling operation involves introduction of a stream of a dispersion of capsules in a curable liquid system into one port of a mold and the withdrawal of a stream of the curable liquid system from another port of the mold. The capsules are entrapped in the mold by a screen or sieve and the introduction and withdrawal is continued until the mold is filled with capsules. The introduction is then stopped and the withdrawal is continued as in the two-step technique. Curing the residual material is conducted as described above.

DESCRIPTION OF PREFERRED EMBODIMENTS

Example 1

In this example, a crayon is prepared using capsules which contain an organic solvent such as toluene and which have, as capsule walls, a complexed-together combination of gelatin and gum arabic. The capsules are made in accordance with U.S. 3,341,466 and are about 50 to 200 microns in average diameter. A cylinder mold is used, less than about one-half inch (about one centimeter) in diameter and about six inches (about fifteen centimeters) long. The mold can have a non-stick interior surface so that it can be removed after curing the binder or, of course, the mold can merely be a spill of paper or other sheet material to remain a permanent part of the finished crayon article. One end of the mold is blocked by a screen and the mold is filled by the dry-walled (but liquid-containing) capsules. A curable liquid system is made using a solution of 10 parts, by weight, of an epoxy resin, and 10 parts, by weight, of a polyamide epoxy curing agent each dissolved in 80 parts, by weight, of toluene. The epoxy resin is a Bisphenol A epoxide and is sold under the tradename "ERL-2772" by Union Carbide Corporation, 270 Park Avenue, New York, N.Y., United States of America. The curing agent is a polyamine condensed with dimeric fatty acids and sold under the tradename "Versamide 125" by General Mills, Inc., Kankakee, Ill., United States of America. The curable liquid system is carefully introduced into the mold and the free liquid is then withdrawn by application of a vacuum. In this example, the free liquid can also be withdrawn by use of a centrifuge which use amounts to an application of a pressure gradient by means of an alteration in gravity forces. It should also be noted that the excess liquid can be removed by simple gravity draining with an attendant feature that porosity of the first-drained portion of the article will be greater than porosity of the last-drained portion because, during the relatively long time that drainage occurs, some of the solvent is evaporated, making the curable liquid more viscous.

Once the free curable liquid is removed from the mold, the residual curable liquid is cured. In this example, curing is accomplished by heating the mold to about 100 degrees centigrade for several hours. The heating evaporates any solvent remaining the mold and cures the epoxy resin to yield a hard, cylindrical, article. Other solvents can also be used in the capsules of this embodiment, such as perchloroethylene or naphtha to clean fabrics and remove spots therefrom.

Example 2

Capsules are used which contain ink solutions or a solution of dye such as Azo Blue-Black B in xylene. As a curable liquid system, an unsaturated polyester compound or a monomer of such a compound is used. These curable systems harden by a free-radical reaction which, when commenced, travels throughout the entire article. Tetraethyleneglycoldimethacrylate, along with about 1 to 2 percent, by weight, benzoyl peroxide is used as the curable liquid and, if desired or required to adjust the viscosity, some thickening agent is added to afford a proper amount of residual liquid after the withdrawal step. As in Example 1, the capsules are introduced into a mold and then the curable liquid is introduced. The free curable liquid is withdrawn and the residual curable liquid is polymerized by 30 to 45 minutes' exposure to a temperature of about 80 degrees centigrade.

Example 3

In this example, a mold in the shape of a bar, is fitted on one end with a screen and a vacuum source leading to an intermediate reservoir. The other end of the mold is open and serves as the introduction port. A mixture of capsules and a curable liquid system comprising 30 to 40 percent, by weight, capsules and 70 to 60 percent, by weight, curable liquid system is continuously introduced into the mold and a vacuum drawn on the mold continuously withdraws the free curable liquid into the reservoir. Capsules are trapped in the mold by the screen and the dispersion is added until the mold is filled with capsules. The vacuum is maintained until all of the free liquid has been removed and then the liquid is cured. Either of the previously-described curable liquid systems are, as an example, eligible for use herein.

Example 4

In this example, to make combustible bricks, capsules about 1000 microns in average diameter and containing kerosene are introduced into brick-shaped molds and a solution of 10 to 20 percent, by weight, of polystyrene in toluene is added as the binder solution. The polystyrene is, for example, about 45,000 to 65,000 molecular weight (Staudinger molecular weight determination) and sold under the trade name "Styron" by Dow Chemical Company, Midland, Mich., United States of America. The free binder solution is withdrawn by a vacuum means and the vacuum is continued thereafter to cure the polystyrene by withdrawing all of the solvent.

Articles made by the process of this invention are usually approximately 60 to 95 percent, by weight, capsule-contained material; the balance being combined capsule wall material and cured binder material. The capsules most usually contain about 80 to 95 percent, by weight, liquid material.

What is claimed is:

1. A process for manufacturing a porous but solid, shaped, article of substantially spherical microcapsules adhered together in capsule-to-capsule contact, comprising the steps of:
   (a) introducing microcapsules of an average diameter of from about 50 to 2000 microns into a mold;
   (b) filling the mold with a curable liquid, having a viscosity of from about 10 to 200 centipoises, to wet and immerse the microcapsules;
   (c) withdrawing the curable liquid until spaces between the capsules are void and curable liquid remains only in dot amounts at capsule-to-capsule points of contact;
   (d) curing the dot amounts of curable liquid
whereby a porous, but solid, article of substantially spherical microcapsules adhered together in capsule-to-capsule contact is formed.

2. A process for manufacturing a porous but solid, shaped, article of liquid-containing microcapsules comprising the steps of:
   (a) introducing a mixture of liquid-containing capsules of an average diameter of from about 50 to 2000 microns and a curable liquid, having a viscosity of from about 10 to 200 centipoises, into one opening of a mold;
   (b) withdrawing curable liquid from a second opening of the mold while continuing step (a);
   (c) continuing steps (a) and (b) until the mold is substantially filled with capsules, then discontinuing step (a);
   (d) continuing step (b) until spaces between the capsules are void and curable liquid remains only in dot amounts at capsule-to-capsule points of contact;
   (e) curing the dot amounts of curable liquid
whereby a porous, but solid, article of substantially spherical microcapsules adhered together in capsule-to-capsule contact is formed.

References Cited

UNITED STATES PATENTS

| | | | |
|---|---|---|---|
| 3,327,036 | 6/1967 | Bakkes | 264—128 |
| 3,166,615 | 1/1965 | Farrell | 264—128 X |
| 1,996,043 | 3/1935 | Gaarder | 264—128 X |
| 3,541,194 | 11/1970 | Resnick | 264—128 X |
| 3,410,936 | 11/1968 | Juras | 264—128 X |

FOREIGN PATENTS

| | | | |
|---|---|---|---|
| 673,669 | 11/1963 | Canada | 264—109 |

ROBERT F. WHITE, Primary Examiner

J. R. HALL, Assistant Examiner

U.S. Cl. X.R.

264—109, 128